US011550836B1

(12) United States Patent
Kumar

(10) Patent No.: US 11,550,836 B1
(45) Date of Patent: Jan. 10, 2023

(54) MACHINE-LEARNING MODEL FOR RESOURCE ASSESSMENTS

(71) Applicant: Oracle International Corporation, Redwood Shores, CA (US)

(72) Inventor: Vivek Kumar, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/396,254

(22) Filed: Aug. 6, 2021

(51) Int. Cl.
*G06F 7/00* (2006.01)
*G06F 16/35* (2019.01)
*G06N 20/00* (2019.01)
*G06K 9/62* (2022.01)
*G06F 16/951* (2019.01)
*G06F 16/31* (2019.01)
*G06F 16/955* (2019.01)
*G06F 40/30* (2020.01)

(52) U.S. Cl.
CPC ............ *G06F 16/35* (2019.01); *G06F 16/313* (2019.01); *G06F 16/951* (2019.01); *G06F 16/955* (2019.01); *G06F 40/30* (2020.01); *G06K 9/6262* (2013.01); *G06N 20/00* (2019.01)

(58) Field of Classification Search
CPC ...... G06F 16/35; G06F 16/955; G06F 16/313; G06F 16/951; G06F 16/2477; G06F 16/9535; G06F 40/30; G06N 20/00; G06N 5/022; G06K 9/6262
See application file for complete search history.

(56) References Cited

U.S. PATENT DOCUMENTS

| 10,831,466 | B2* | 11/2020 | O'Malley | H04L 67/303 |
| 2018/0082389 | A1* | 3/2018 | Guggilla | G06N 20/00 |
| 2019/0164170 | A1* | 5/2019 | Kataria | G06Q 10/105 |
| 2020/0065383 | A1* | 2/2020 | Hadi | G06F 40/205 |
| 2021/0160154 | A1* | 5/2021 | Cohen | H04L 43/16 |
| 2022/0108359 | A1* | 4/2022 | Dieter | H04L 67/55 |

* cited by examiner

*Primary Examiner* — Mohammad A Sana
(74) *Attorney, Agent, or Firm* — Kilpatrick Townsend & Stockton LLP

(57) ABSTRACT

A centralized system may collect and aggregate assessments from multiple websites. An aggregate score may be calculated for the resource that cumulatively considers assessments from a plurality of different websites from which assessments are received from users. Text descriptions associated with each of the assessments may be provided to a machine-learning system that uses a trained model to assign identifiers to the assessments as they are received. These identifiers may include common words or text that are descriptive of different facets of user experiences related to receiving and using the resource. After selecting one or more identifiers, assessments associated with that identifier may be included or excluded from the display. Additionally, the overall aggregate score for the resource may be recalculated by removing components of that score that are based on assessments with identifiers that have been selected for exclusion.

20 Claims, 10 Drawing Sheets

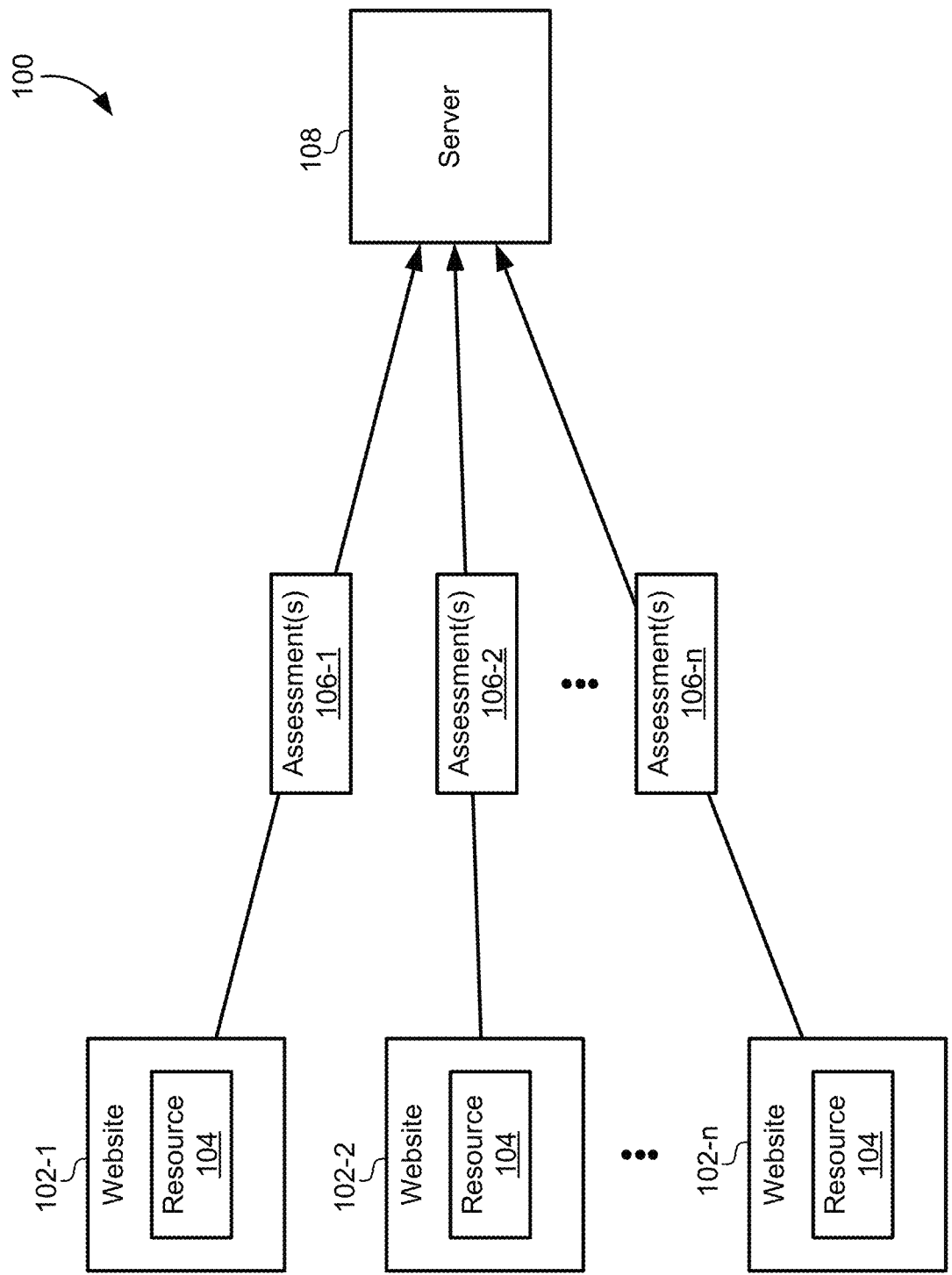

108

Server 202

| Website ID | Name | Type | End Point |
|---|---|---|---|
| 1234 | ACME | webhook | https://acme.com/resources/ws |
| 3442234 | Store 1 | REST | https://store1.com/resources |
| 4773738 | Cloud Service X | webhook | https://cloudser.com/resources/ws |

204-1

ResourceID: 2234124

| 206 | 208 |
|---|---|
| Score: 5 | Description: "The quality is great, I really appreciate feature..." |
| Score: 4 | Description: "Everything works as advertised. The only..." |
| Score: 1 | Description: "The download was slow and I had problems..." |
| ⋮ | |
| Score: 4 | Description: "It looks a little different than the pictures..." |

209 — Aggregate Score: 4.127

204-2

ResourceID: 2234125

| Score: 4 | Description: "This is exactly what I was looking for..." |
|---|---|

MACHINE-LEARNING MODEL FOR RESOURCE ASSESSMENTS

BACKGROUND

Electronic markets (or electronic marketplaces) may be defined as information systems that are used by multiple separate organizational entities. Electronic markets denote networked relationships with many possible configurations. The topology of electronic markets may be centralized or decentralized in nature. Centralized electronic markets are hubs which often provide services to their participants. Decentralized settings involve sequential relationships that often are found when electronic messages are exchanged directly between entities (e.g., electronic data interchange, EDI). The services provided by electronic markets may serve infrastructural or allocation purposes. Among the infrastructure services are routing, messaging, identification and partner directories whereas allocation services enable pricing process which in turn may be static or dynamic in nature. Typical implementations are catalogs, exchanges and auctions. In a broader sense, electronic markets may cover all forms of electronic collaboration between organizations and users/clients as well as vice versa.

However, espite the efficiencies that may be gained by using electronic markets, the problem remains that access to resources is largely virtual rather than hands-on. Thus, instead of relying on a personal interactions with the resource, users are often required to rely instead on assessments of the resource made by others. These assessments can be quite numerous and may cover a wide range of characters that may or may not be relevant to the user. Therefore, improvements in the art are needed to refine the way in which the user assessments are stored, aggregated, and presented.

BRIEF SUMMARY

The embodiments described herein use a centralized system to collect and aggregate assessments from multiple websites. An aggregate score may be calculated for the resource that cumulatively considers assessments from a plurality of different websites from which assessments are received from users. Text descriptions associated with each of the assessments may be provided to a machine-learning system that uses a trained model to assign identifiers to the assessments as they are received. These identifiers may include common words or text that are descriptive of different facets of user experiences related to receiving and using the resource. The assessments may be provided to users in a unified interface along with an aggregate score across all of the different websites from which assessments are received. Additionally, the identifiers that are commonly associated with these assessments may also be displayed, and users may be allowed to select individual identifiers that should be included and/or excluded from the display. After selecting one or more identifiers, assessments associated with that identifier may be included or excluded from the display. Additionally, the overall aggregate score for the resource may be recalculated by removing components of that score that are based on assessments with identifiers that have been selected for exclusion. This provides a machine-learning based user interface display that allows users to sift through a large amount of information very quickly to find assessments that are relevant for their particular situation and needs. This also may generate an overall aggregate score for a resource that accurately reflects the concerns of individual users.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components.

In some instances, a sub-label is associated with a reference numeral to denote one of multiple similar components. When reference is made to a reference numeral without specification to an existing sub-label, it is intended to refer to all such multiple similar components.

FIG. 1 illustrates a block diagram of a system that can aggregate assessments from a plurality of different sources, according to some embodiments.

FIG. 2 illustrates a website repository that may be stored at the server, according to some embodiments.

DETAILED DESCRIPTION

Figure 3:
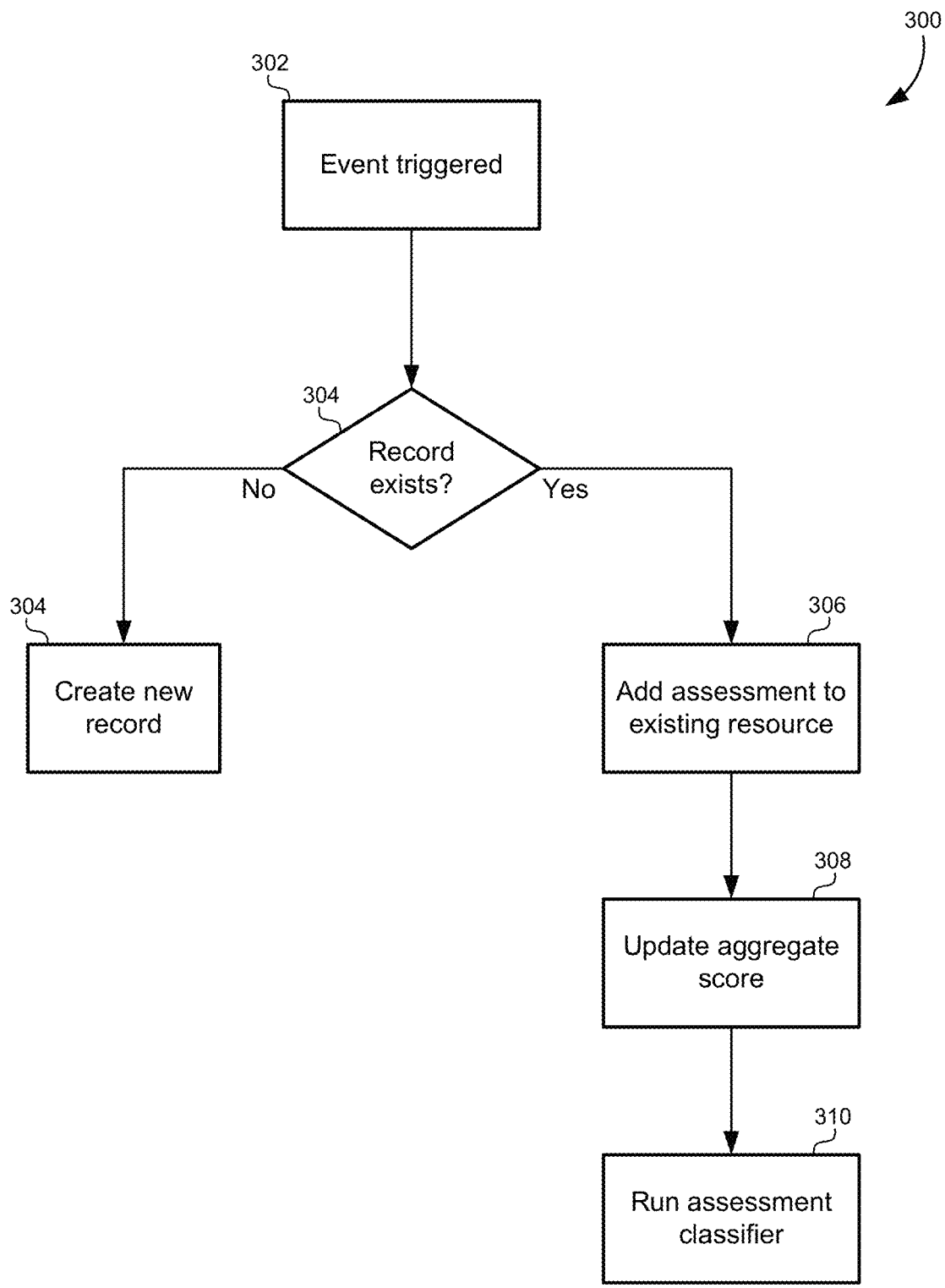
FIG. 3 illustrates a flowchart of a method for receiving and processing new assessments or resources from websites, according to some embodiments.

Many different resources are now available through network technologies. These resources may include a wide array of physical and virtual components. While descriptions of resources may be available on supplying websites, uses are often only able to experience a resource firsthand after the resource has been received by the user. Thus, users are often expected to analyze the many different resource offerings available and make a decision without first having the opportunity to experience, test, or use the resource firsthand.

One feature that enables clients to select between the many different resources that may be available is the creation, summarization, and display of assessments. An assessment may include any review, grade, rating, defect report, incident report, or other descriptive information from the client regarding a user experience with the resource. These assessments may be made publicly available to be displayed on client devices such that users can distinguish between the different resources available. Assessments often derive their value from the fact that they are provided from users having actual experience with the resource rather than from biased sources such as manufacturers, suppliers, advertisers, and/or other professional sources. Specifically, assessments often provide actual use-case information that prospective future users in similar situations find beneficial. Alternatively, some assessments may also include professional or industry-based reports on the quality of the resource.

While the largely crowd-sourced nature of these assessments provides transparency and confidence for future users, this system is not without technical drawbacks. For example, assessments are often not curated for content. Therefore, some assessments may include information that is irrelevant to a particular user's concerns. Any numerical score provided as part of the assessment may thus be heavily influenced by factors that are not of concern to some users. For example, some assessments may include information that is critical of a source of the resource, such as a manufacturer or a website through which the resource is made available. Some future users may be more concerned with the quality of the resource itself, and may not be interested in an assessment related to a supplier or manufacturer. In another example, some assessments may include information related to a delivery method of the resource rather than to the resource itself. Software downloads may be evaluated and/or other delivery methods may be critiqued as part of the assessment. While this information may be useful for some users, others may not be interested in scores that are heavily influenced by a negative or positive experience receiving the resource. In another example, some assessments may include information regarding customer support services rendered after receiving the resource. Again, individual users may find this information useful and relevant to the resource itself, while others may wish to exclude this information from consideration. Additionally, many different assessments and scores may be stored in presented in many different locations. For example, many different websites or online vendors may provide similar resources. Assessments are often only stored, presented, aggregated, and/or provided for each individual website. One website may be associated with mostly positive assessments, while another website may be associated with largely negative assessments, regardless of the actual experience with the resource. Therefore, there is currently no system available that provides an overall aggregation and presentation of assessments from multiple online sources.

The embodiments described herein solve these and other technical problems by using a centralized system to collect and aggregate assessments from multiple websites. An aggregate score may be calculated for the resource that cumulatively considers assessments from a plurality of different websites from which assessments are received from users. Text descriptions associated with each of the assessments may be provided to a machine-learning system that uses a trained model to assign identifiers to the assessments as they are received. These identifiers may include common words or text that are descriptive of different facets of user experiences related to receiving and using the resource. The assessments may be provided to users in a unified interface along with an aggregate score across all of the different websites from which assessments are received. Additionally, the identifiers that are commonly associated with these assessments may also be displayed, and users may be allowed to select individual identifiers that should be included and/or excluded from the display. After selecting one or more identifiers, assessments associated with that identifier may be included or excluded from the display. Additionally, the overall aggregate score for the resource may be recalculated by removing components of that score that are based on assessments with identifiers that have been selected for exclusion. This provides a machine-learning based user interface display that allows users to sift through a large amount of information very quickly to find assessments that are relevant for their particular situation and needs. This also may generate an overall aggregate score for a resource that accurately reflects the concerns of individual users.

FIG. 1 illustrates a block diagram of a system 100 that can aggregate assessments from a plurality of different sources, according to some embodiments. The system may interface with a plurality of different websites 102. In some embodiments, the websites 102 may represent unrelated vendors. For example, a software resource may be provided for download by a number of different web sites. These different websites may be operated by different entities and may be unrelated to each other, being operated, hosted, and/or geographically located in different locations and using different and separate computer hardware and/or software systems. For example, a first website 102-1 may include an app store hosted by a mobile service provider, while a second website 102-2 may include an online marketplace, such as the Amazon® website.

In some embodiments, the plurality of websites may be organized under a single organizational framework. For example, the websites 102 may be part of an internal network or company infrastructure. The plurality of websites 102 may be owned/operated by a single entity or related entities. In some cases, the websites 102 may still use separate computer hardware and/or software to host the resources as they are made available, or the websites 102 may share computer hardware and/or software. For example, the website 102 may be represent separate modules or software components in an enterprise software system.

Regardless of how the plurality of websites 102 are hosted, the term website should be interpreted broadly herein. For example, a website may include a traditional HTML-based website that is downloaded and/or displayed using a web browser on a client device. A website may also include a backend for an application (or "app") that is downloaded or operated on a mobile device or tablet computing device, as well as an application that is downloaded and operated on a traditional computing device such as a desktop device or workstation. These apps or applications may download information regarding the resource from a Web server, including various assessments that have been received that are related to the resource, and the resource information and/or assessments may be displayed on the client device using the app or application. The websites 102 may also provide client-side interfaces that are nontraditional, such as through digital home assistants that can provide opportunities and interfaces for users to review and/or order resources verbally or through other forms of communication.

The websites 102 may provide a large number of different resources at their individual online presence. In this disclosure, the term resources may include any virtual and/or physical product or service that is made available by the websites 102. For example, resources may include software, software downloads, software upgrades or patches, cloud services, access to cloud infrastructures, Infrastructure as a Service (IaaS), Platform as a Service (PaaS), Software as a Service (SaaS), distributed storage, browser-based applications, subscriptions, incident management, live support services, and/or other computer-based resources. Additionally, resources may include physical objects, such as computer hardware, server equipment, peripheral devices, traditional goods, and/or any other type of physical product or physical service. These physical objects may be accessed, previewed, and/or acquired over a network interface and then shipped to the location of the user. Various embodiments may limit the wide range of resources described above down to a specific category, such as software downloads, software upgrades, physical products, and/or any other category in those particular embodiments.

In this example, a resource 104 is provided by the plurality of different websites 102. For example, a software download for a particular software application may be available for download from the first web site 102-1, the second website 102-2, and so forth. The resource may be identical at each of these web sites 102. Prior to this disclosure, users visiting the first website 102-1 would only see assessments that were submitted to the first website 102-1. Therefore, negative customer experiences with the first website 102-1 may negatively influence an overall aggregate score of the assessments generated by the first website 102-1. In contrast, the second website 102-2 may provide a better customer experience, resulting in higher aggregate scores for the resource 104. Alternatively, users may view the first website 102-1 less favorably than the second website 102-2, or the first website 102-1 may use a less reliable delivery method for the software than the second website 102-2. The overall assessments for the same resource 104 may vary widely between the different websites 102 at which the resource is made available, and these assessments may be based on factors that are unrelated to the resource 104 itself.

To solve this technical problem, a server 108 may be used to collect and aggregate various assessments 106 from the plurality of websites 102. As used herein, the term server 108 may refer to a single server or set of computer hardware and/or software that collects the assessments 106. However, the server 108 may be distributed in many different locations using different hardware and/or software. Thus, the term "server" should be broadly interpreted to include a system that centrally receives and aggregates the assessments 106 from the plurality of websites 102 regardless of the locations or manner in which it is implemented in hardware and/or software. For example, the server 108 may include distributed crawl modules or software agents that may be deployed to the websites 102, cloud-based machine-learning routines, and/or distributed user interfaces in any combination and without limitation.

The server 108 may collect the assessments 106 using a number of different methods. For example, as new assessments are received from users at the websites 102, the assessments 106 may be transmitted to the server 108. The assessments 106 may be received as individual assessments or as batches of assessments at regular intervals. In this example, the assessments 106 may be related to a single resource 104 that is commonly available at each of the websites 102. However, FIG. 1 is simplified for the sake of clarity, and it should be understood that the websites 102 may provide a large number of resources, each of which may be associated with a large number of assessments. Thus, the server 108 may receive batches of assessments that are related to many different resources available at the websites 102. As described below, some embodiments may also receive an indication from the websites 102 when a new resource is added or made available by the websites 102.

The server 108 may be associated with one or more of the websites 102. Alternatively, the server 108 may be part of a separate service that aggregates and compares distribution of the resource from various websites 102. The server 108 may also be run by a user or user group that aggregates and analyzes assessments from various sources for the resource.

FIG. 2 illustrates a website repository that may be stored at the server 108, according to some embodiments. This repository may store details from the various websites offering the same types of resources. As described above, the repository may receive assessments related to resources from a plurality of different websites, and each of the different websites may maintain their own individual repositories of assessments related to these resources. When new resources and/or assessments for resources are added to any of the websites, an indication of the new resource and/or any accompanying assessments may be transmitted to the server 108 for central analysis and storage.

The repository may include a registry 202 that stores information used to communicate with the websites. The registry 202 may include a unique ID for each website or vendor, and may also optionally include a descriptive name for the website. For each website entry, the repository may include a method of communication used to receive assessments and resource IDs from the websites. For example, a website may use a REST end point that may be continuously polled to determine when a new resource is added or when a new assessment is added for an existing resource. The registry 202 may include a type that indicates a REST interface, along with a URL identifying the endpoint address. In another example, the website may register a webhook that may generate an event indicating that a new resource has been added to the website or a new assessment has been added to the website for an existing resource. The registry 202 may then include a type that indicates a webhook interface along with an endpoint address. Other communication technologies may also be used, and these columns (e.g., type, endpoint, etc.) may be used to provide the technical details for downloading assessments from these websites.

The server may also include one or more data structures 204 that aggregate and store assessments for individual resource IDs. Although FIG. 2 only illustrates a small number of data structures 204 for corresponding resources, this is done only for the sake of clarity. In practice, the server 108 may store data structures for any and all resources available at the websites, which may include many thousands of resources. When receiving an assessment from the website, the assessment may be associated with the corresponding resource ID that uniquely identifies the resource at the website. The resource ID of the new assessment may be used to store the assessment in a data structure 204 for the corresponding resource. Thus, the server 108 may collect assessments for each individual resource and store them together.

In some cases, the resource ID need not be uniformly represented at the various websites. For example, a single resource may be represented by different resource IDs at different websites. Therefore, some embodiments may include a mapping of external resource IDs at each of the websites into an internal resource ID stored and used at the server 108. As new assessments and/or resources are received by the server 108, the repository may use this mapping to translate the website-specific resource IDs received from the websites into a common resource ID used by the server 108, and vice versa.

In some embodiments, an assessment may include a score 206. The score may include a numerical range of scores (e.g., rating from 1-5), a range of qualitative scores (e.g., bad, ok, good, great), a range of letter scores (e.g., A-F), a selection from a set of graphical indicators (e.g., frowning emoji, neutral emoji, smiling emoji), and/or any other type of metric, such as a star rating, a freshness rating, and so forth. In this example, the score 206 may include a numerical score on a rating scale of 1 to 5.

An assessment may also include a text description 208. For example, users may enter an assessment by choosing a score 206 (e.g., a number of stars with which to rate the resource), then enter a text description that describes their experience with the resource. The text description 208 may include any type of text and need not be limited or filtered by the websites or the server 108. For example, the text description 208 may include narrative descriptions of a user's experience with the resource, including installation, download, opening, customer service, use of the resource, and so forth. The text description 208 may also include descriptions of user experiences with the website itself, a supplier or manufacturer of the resource, delivery channels for providing the resource to the user, a reputation our perception of the product, and so forth. The text description 208 may include pros/cons lists, web links, links to pictures, links to other assessments, and/or other references to additional information.

In some embodiments, the data structures 204 for each resource may also include an aggregate score 209. The aggregate score 209 may aggregate the individual scores 206 received with the assessments for each resource ID. The aggregate score 209 may be calculated using many different statistical or mathematical operations that combine the individual scores 206 into the aggregate score 209. For example, some embodiments may average the scores 206 to generate the aggregate score 209. Other embodiments may use a median or mode of the scores 206. Some embodiments may use a weighted combination of scores that weights the individual scores according to various criteria, such as how recently an assessment was received, a length of the corresponding text descriptions 208, whether the source is a verified user of the resource, and/or other criteria. The aggregate score 209 may be stored as an overall representation of a user experience with the resource.

FIG. 3 illustrates a flowchart 300 of a method for receiving and processing new assessments or resources from websites, according to some embodiments. The method may include receiving a trigger or other indication that new information regarding a resource is available at a website (302). For example, an event may be generated by the website and transmitted through the webhook protocol described above. This event may be generated by the website as a result of (1) a new resource being added to the website, and/or (2) a new assessment for an existing or new resource being received by the website.

Alternatively, the event may be triggered at the repository. For example, a timer or other event may cause the repository to actively poll one or more of the websites (e.g., using a REST interface) to retrieve any new resources and/or assessments. In some embodiments, the websites may send any new assessments and/or resource indicators that have been received since a previous request rather than sending a record of all assessments and/or scores that are available at the website. This may allow the overall transmission bandwidth between the websites and the repository to be minimized.

The method may also include determining whether a record for the resource already exists at the repository (304). For example, a new assessment may be received with a corresponding resource ID. The repository may compare the corresponding resource ID with a list of known resource IDs from that particular website in a mapping table as described above. The repository may also compare the corresponding resource ID with other resource IDs stored in data structures at the repository. If no corresponding resource ID is found, the method may include creating a new record and/or data structure to store assessments for the new resource (304). This operation may be executed when a new assessment is received for an unidentified resource ID, and/or when the event indicates that a new resource has been added to the website, which may or may not include a corresponding assessment at that time.

If a record already exists for the new assessment, the method may include adding the assessment to an existing data structure for the resource (306). For example, the repository may locate the corresponding data structure for the matching resource ID and store at least the score and/or text description in the data structure. Additionally, the method may include updating the aggregate score (308). When a new score is received, a new average, mode, median, weighted combination, etc., may be calculated that incorporates the new score with the existing scores already stored at the repository for that resource. This may cause the aggregate score to increase/decrease based on the score of the new assessment. Finally, the new assessment may be sent to an assessment classifier that uses a model to assign identifiers to the assessment (310) as described in detail below.

Figure 4:
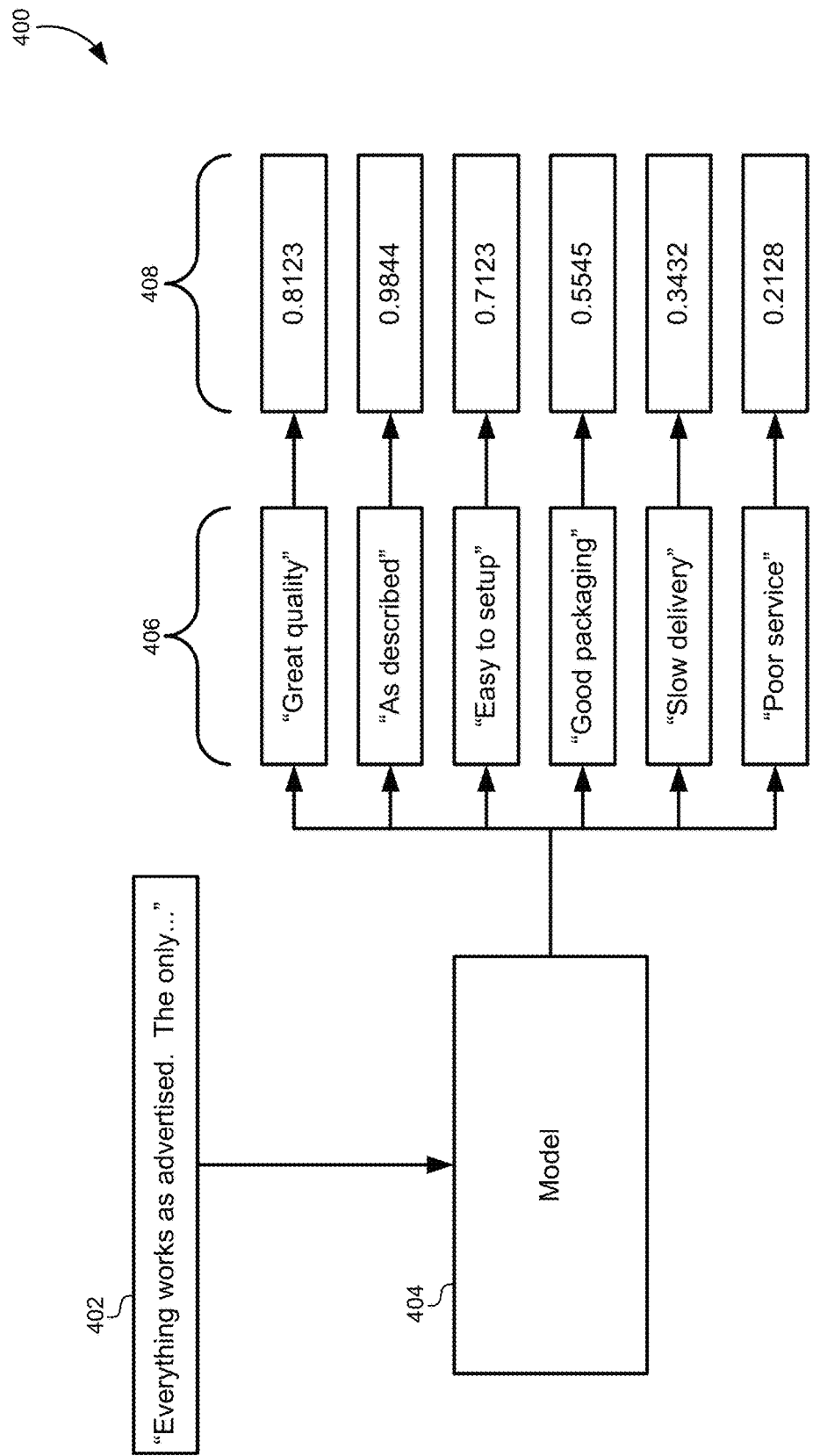
FIG. 4 illustrates a machine-learning process for assigning identifiers to individual assessments, according to some embodiments.

FIG. 4 illustrates a machine-learning process for assigning identifiers to individual assessments, according to some embodiments. When a new assessment is received for a resource, the assessment may be added to the corresponding data structure for that resource, and the aggregate score for the resource may be recalculated as described above. Additionally, the assessment may be further characterized by a model 404 to assign identifiers that represent semantic expressions or ideas that are likely to be present in the text description of the assessment.

For example, a text description 402 may include a narrative or any other type of text received from a user describing their experience with the resource. The text description may include all different types of user expressions that need not be limited in their content. For example, the text description 402 may recite something such as the following. "Everything works as advertised. The only complaint I have is with the display, which is not as crisp as I would hope. The download was fast and only took a few minutes to install. When using the software, I noticed that my CPU usage went way up. So even though the software functions fine, it doesn't seems to be operating efficiently on my computer." This text description includes semantic expressions that characterize the resource itself, the delivery method for the resource, and technical aspects of the resource, among others.

The model 404 may receive the text description 402 as an input. The model may include a machine-learning model that has been trained using labeled text descriptions in a supervised learning environment. For example, the model 404 may be a classification model implemented using a neural network that receives inputs and classifies the input according to a plurality of different output categories. The output categories may include identifiers 406. The identifiers 406 may include semantic expressions that may be commonly found in the text descriptions of assessments. The model 404 may be trained to receive the text description 402 and generate a confidence score 408 associated with each of the identifiers 406 as they apply to the text description 402. For example, the machine learning model 404 may classify the text description in each new assessment into the categories represented by the identifiers 406 with a confidence score 408. The score may then be compared to one or more thresholds to determine whether to assign the identifier to the assessment, or to cause a manual analysis to be performed on the text description 402 and the corresponding identifier to retrain the model 404.

The model 404 may analyze the text description 402 as a whole to assign the confidence scores. Thus, the confidence scores 408 assigned to the identifiers 406 may indicate how strongly the semantic expression represented by the identifiers 406 is present in the text description 402 as a whole rather than focusing on individual syntactic substrings. For example, one of the identifiers 406 may include the semantic expression "great quality," indicating that user rates the resource as having superior quality. However, rather than simply searching the text description 402 for text strings that syntactically match the identifier "great quality," the model 404 is instead trained to recognize equivalent expressions using different syntax in the text description 402 that have a similar semantic meaning. For example, the model 404 may generate a high confidence score for the "great quality" identifier when the text description 402 includes phrases such as "superior quality," "the quality of this resource is fantastic," "very pleased with the quality of the resource," "everything is great," and so forth. The model 404 may be trained to recognize these types of different semantic expressions by providing previous assessments that include these and other expressions to the model 404 for training having a similar tone. These training text descriptions may be labeled and categorized under the "great quality" identifier. This allows the model 404 to flexibly recognize different syntactic expressions that include the same semantic meaning when classifying subsequent text strings.

The confidence scores 408 may indicate the confidence level of the model 404 when assigning the corresponding identifiers 406 to the text description 402. For example, if the text description 404 includes the phrase "superior quality," the corresponding confidence score for the "great quality" identifier may be relatively high (e.g., greater than 95%). This may cause the identifier to be assigned to the input text of the text description 402. However, if the text description 404 includes the phrase "crazy quality," the corresponding confidence score may be much lower. If the model 404 has not yet been trained to recognize the semantic meaning of "crazy quality," then the model 404 may return a low confidence score for the "great quality" identifier. The model 404 can then recognize text descriptions that express the "great quality" identifier as a whole rather than focusing on individual semantic expressions.

Note that the model 404 is trained to recognize the general tone and semantic meaning of the text 402 as a whole. This allows the model to correctly classify somewhat ambiguous terms (e.g., "crazy quality"). For example, if the overall meaning of the text description 402 is complementary of the resource, then ambiguous terms such as "crazy quality" may be interpreted as being associated with other positive identifiers, such as "great quality." Similarly, an overall negative semantic meaning for the text description 402 may cause such ambiguous terms to generate a lower confidence score for positive identifiers.

Figure 5:
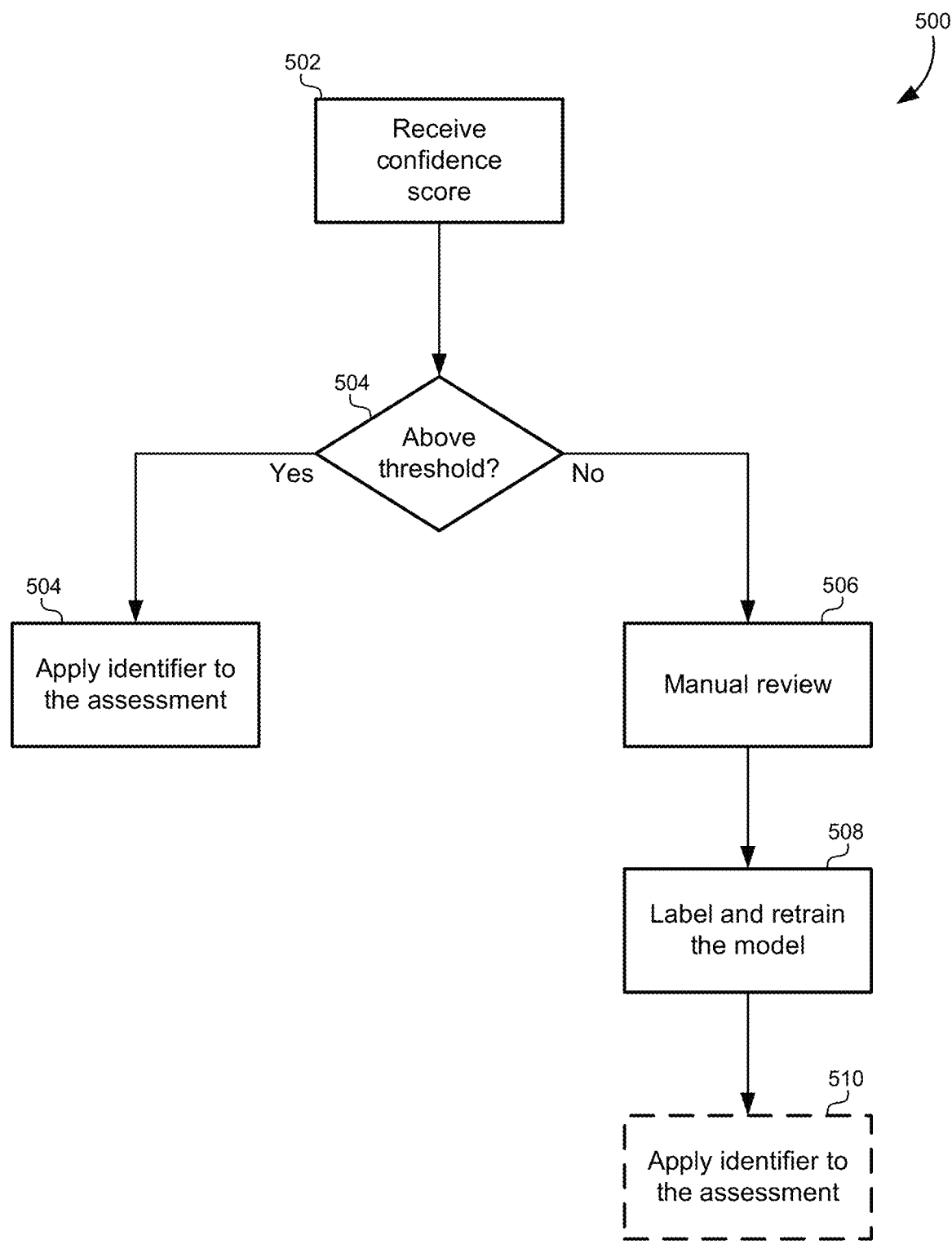
FIG. 5 illustrates a flowchart of a method for using an training a machine-learning model to assign identifiers to assessments, according to some embodiments.

FIG. 5 illustrates a flowchart 500 of a method for using and training a machine-learning model to assign identifiers to assessments, according to some embodiments. This method relates to how the output of the model can be used to tag the input text description with an identifier and/or to retrain the model. Therefore, this process may be executed after processing an assessment as described above in FIG. 4. As an output of the model, particular identifiers may each receive a confidence score (502). The confidence score may indicate a statistical confidence with which the identifier is semantically related to the input text description.

The method may include comparing the confidence score to one or more thresholds (504). If the confidence score is above a predetermined threshold, then the input text description and corresponding assessment may be associated with the identifier. For example, for confidence scores that are relatively high (e.g., greater than 90%, 95%, etc.) there is a very high likelihood that the model has correctly determined that the identifier applies to the input text description. As described below, identifiers for each assessment may be displayed in the user interface to allow the user to selectively control how the aggregate score for resources is calculated.

If the confidence score falls below a predetermined threshold, then a manual review of the text description, identifier, and/or confidence score may be initiated (506). Note that the threshold that causes the identifier to be applied to the assessment (504) may be different from the threshold that causes a manual review (506). For example, a relatively low confidence score (e.g., less than 30%, 25%, etc.) may indicate that the model is uncertain how to classify the text description relative to the identifier.

Manual review may cause the text description to be displayed to a user. The user may then determine whether the identifier should apply to the text description. This determination made by the user that is provided by way of an input to the system and used to label the text description. The combination of the text description and the label may then be used as new training data for the model (508). If this process receives a determination from the user that the identifier should be associated with the text description, then the system may apply the identifier to the assessment (510).

Figure 6:
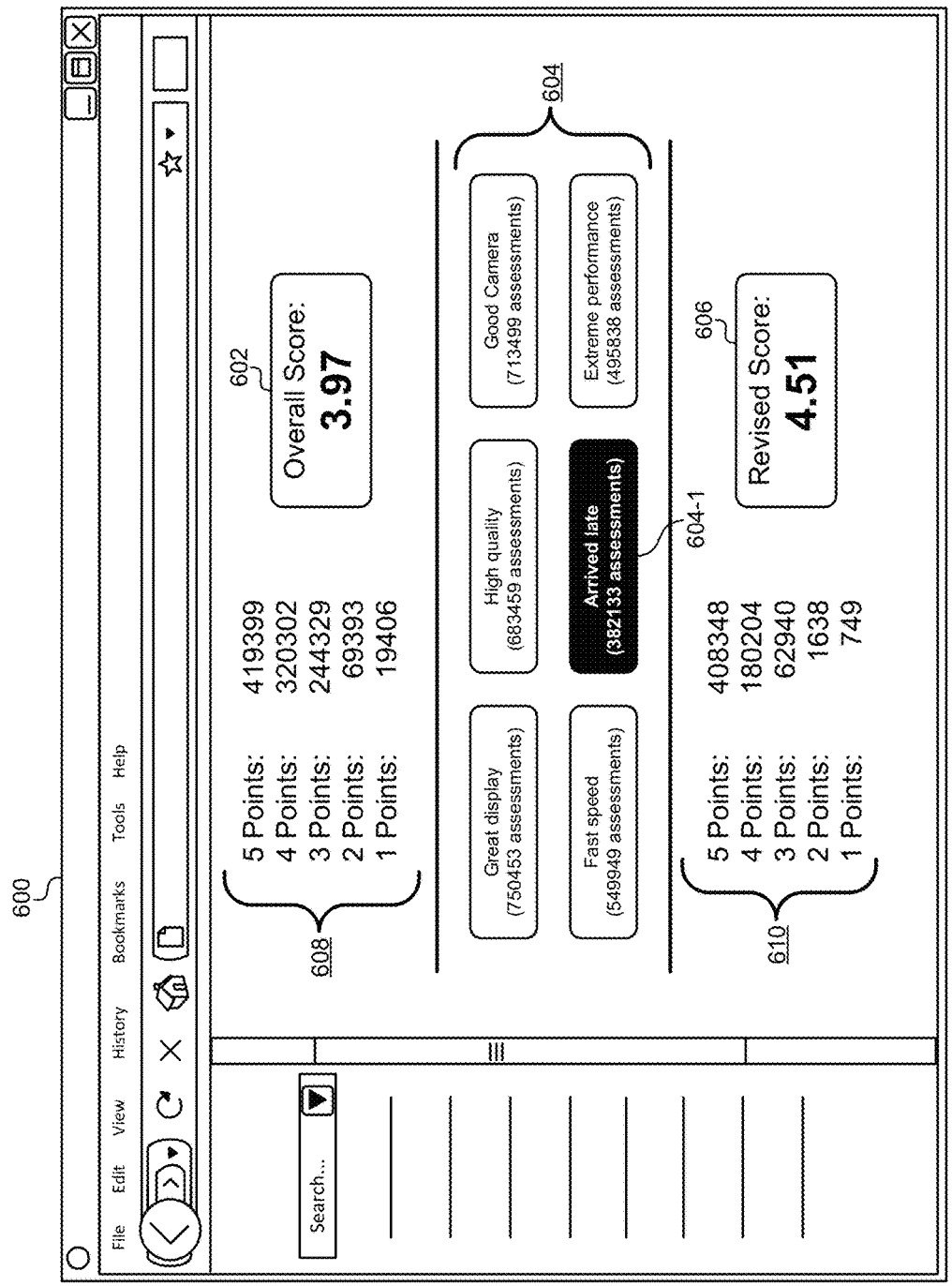
FIG. 6 illustrates a user interface of a recommendation engine that may be provided using outputs of the model, according to some embodiments.

FIG. 6 illustrates a user interface 600 of a recommendation engine that may be provided using outputs of the model, according to some embodiments. The user interface 600 may represent a user-facing component of the system, where the user may search for individual resources by name, resource ID, description, and/or any other characteristic. When a particular resource is selected, the user interface 600 may display a summary of the assessments that have been received and aggregated from the different websites where the resource may be available. Instead of requiring the user to go to individual websites and evaluate the assessments individually, this user interface 600 may aggregate all of the assessments from the various websites and generate a single aggregate score 602 that summarizes the assessments that have been received.

The summary information in the user interface 600 may include an aggregate total of assessments received at different levels. In this example, the numerical score may include a range of scores from 1 to 5. A summary 608 of the number of assessments received with each numerical integer score in that range are displayed in the user interface 600. Additionally, the aggregate score 602 may be generated as an average (or some other combination) of the scores received as part of the assessments from the various websites.

Not only does the user interface 600 aggregate and display the information from a plurality of different websites, the user interface 600 also displays an interactive portion of the interface that allows the user to see the specific identifiers 604 that have been applied to the assessments that make up the aggregate score 602. In this example, each of the identifiers 604 also displays the number of assessments to which that identifier has been assigned. This allows the user to see the various types of semantic expressions that are present in the assessments that make up the aggregate score 602.

In some embodiments, the display of the identifiers 604 may be an interactive display that allows the user to select one or more of the identifiers 604 to exclude or include assessments that are tagged with those identifiers when calculating the aggregate score 602. In this example, the user may select the "arrived late" identifier 604-1 to exclude portions of the assessments that are associated with that identifier 604-1. Specifically, the user may decide that a method by which the resource is delivered to the user is not important in determining the quality of the resource itself. Therefore, the user may choose to have the system ignore portions of text descriptions that are associated with the "arrived late" identifier 604-1.

When the system receives a selection of a subset of the identifiers that should be excluded for this particular user, the system may recalculate the aggregate score for the resource such that the recalculated score is instead based on the subset of these assessments that remain in the identifier group. In this example, an additional summary 610 may be displayed that illustrates how many assessments are assigned to each numerical score level once the assessments that are tagged with the excluded identifier 604-1 have been ignored. Additionally, contributions made by portions of the assessments that are associated with the identifier 604-1 may be removed from the aggregate score calculation, and a recalculated score 606 may be displayed. Note that in this example, the recalculated score 606 has increased by removing the low scores received from users upset that the resource "arrived late."

Note that this example allows the user to process the recalculated score 606 by receiving a selection of identifiers to be omitted. Alternative embodiments may receive this subset of identifiers finds that allowing the user to select identifiers that should be included in this calculation. Additionally, some embodiments may group subsets of the identifiers together that are related to specific topics. For example, the user interface 600 may group identifiers together that focus on the quality of the resource, while grouping identifiers together that instead focus on the quality of other aspects of the resource, such as customer support, delivery, supplier reputation, and so forth. These embodiments may allow the user to select entire subsets together for inclusion/exclusion based on how they apply to the resource.

Figure 7:
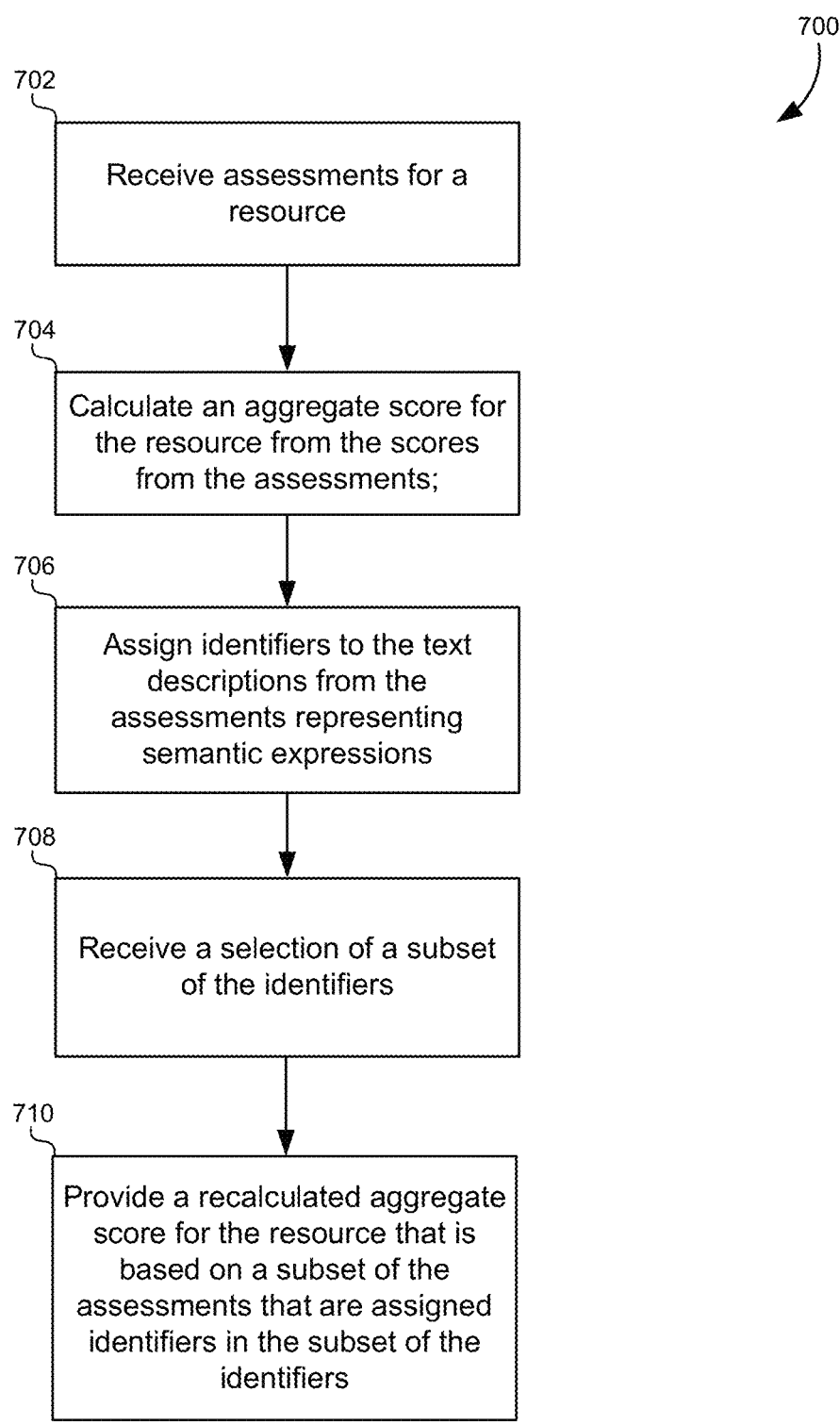
FIG. 7 illustrates a flowchart of a method for selectively characterizing a resource, according to some embodiments.

FIG. 7 illustrates a flowchart 700 of a method for selectively characterizing a resource, according to some embodiments. The method may include receiving assessments for a resource (702). For example, assessments may be received from one or more websites as illustrated and described above in relation to FIGS. 1-3. The method may also include calculating an aggregate score for the resource from the scores from the plurality of assessments (704). For example, the individual scores received as part of the assessments may be combined using various methods to generate an overall score as illustrated and described above in relation to FIG. 2. The method may further include assigning identifiers to the text descriptions from the plurality of assessments (706). The identifiers may represent semantic expressions in the text descriptions. Identifiers may be assigned using a machine-learning model as illustrated and described above in relation to FIGS. 4-5. The method may additionally include receiving a selection of a subset of the identifiers (708); and providing a recalculated aggregate score for the resource that is based on a subset of the plurality of assessments that are assigned identifiers in the subset of the identifiers (710). The subset identifiers may be selected and the score may be recalculated as illustrated and described above in relation to FIG. 6.

It should be appreciated that the specific steps illustrated in FIG. 7 provide particular methods of selectively characterizing a resource according to various embodiments. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 8:
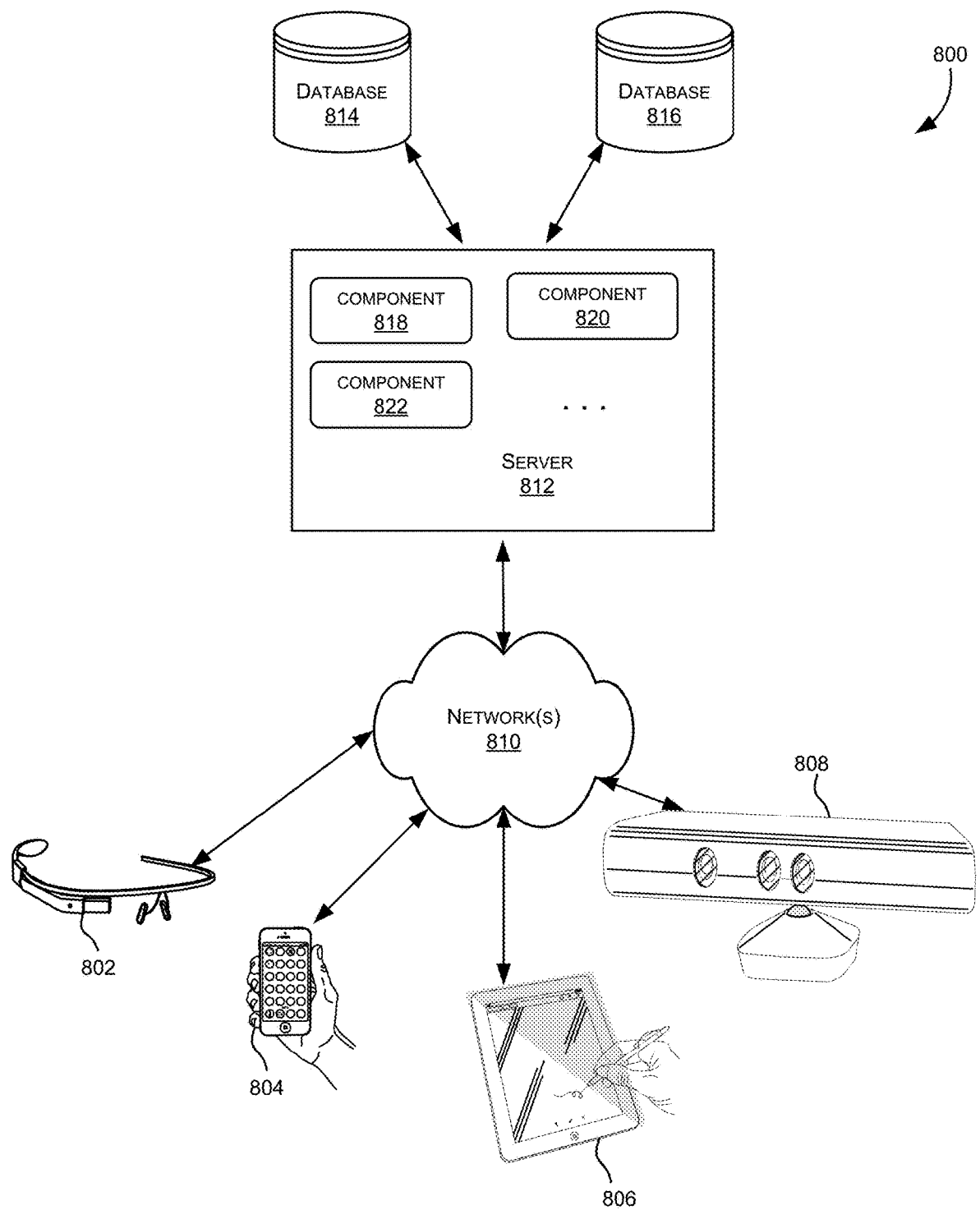
FIG. 8 illustrates a simplified block diagram of a distributed system for implementing some of the embodiments.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
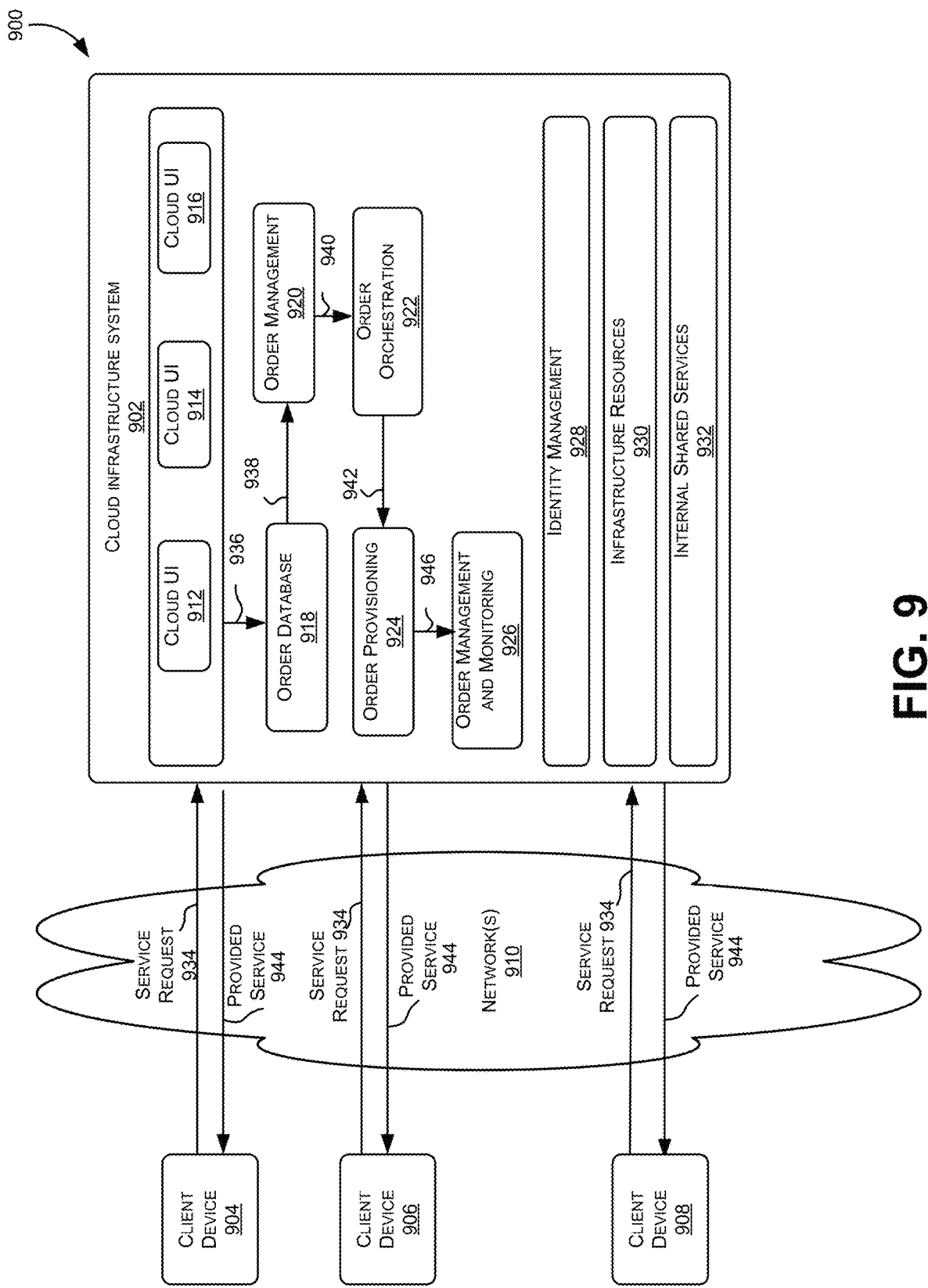
FIG. 9 illustrates a simplified block diagram of components of a system environment by which services provided by the components of an embodiment system may be offered as cloud services.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the system shown in the figure is only one example of a cloud infrastructure system that may incorporate some embodiments. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
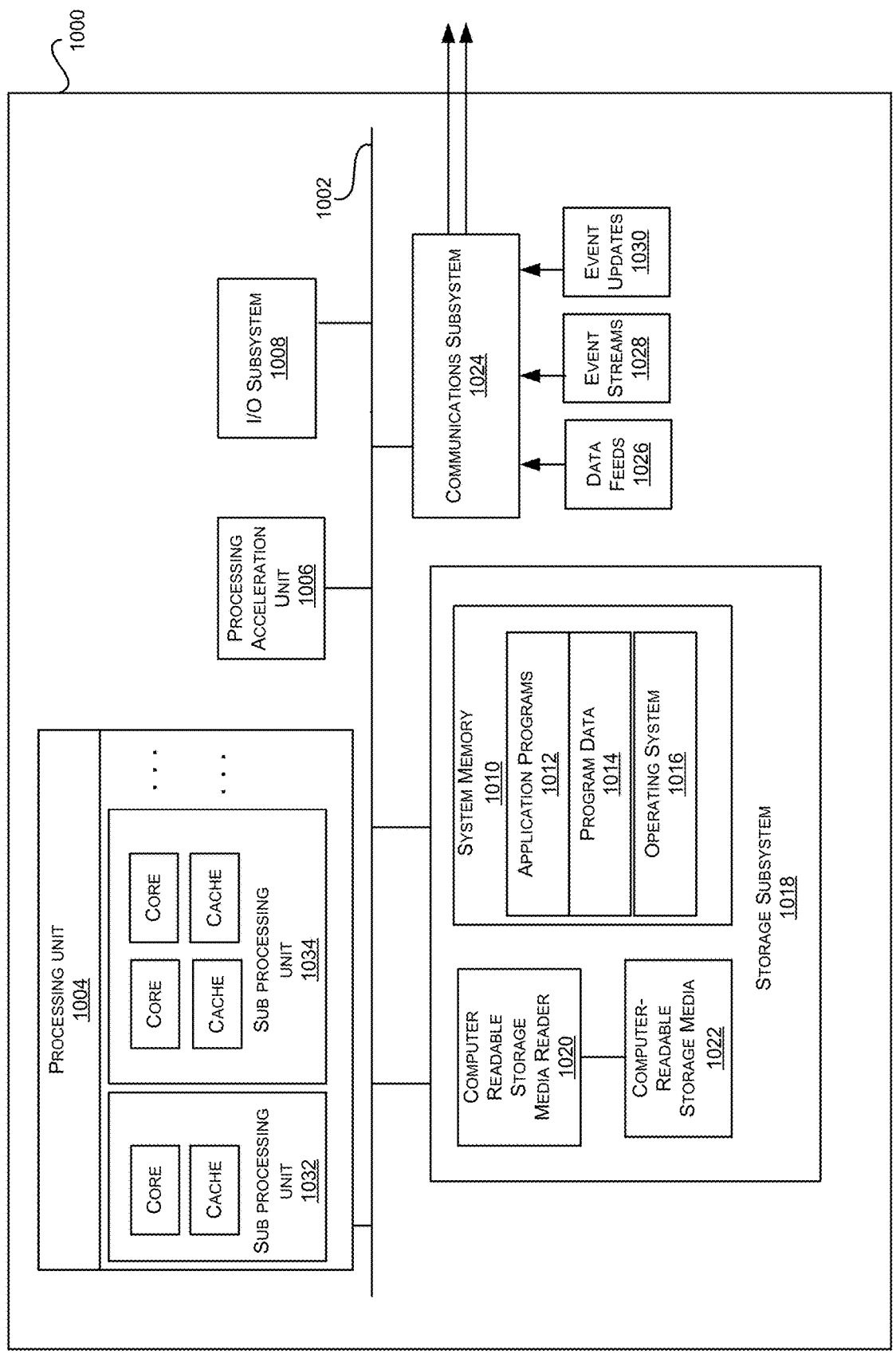
FIG. 10 illustrates an exemplary computer system, in which various embodiments may be implemented.

FIG. 10 illustrates an exemplary computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with some embodiments.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have beeen described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
   receiving a plurality of assessments for a resource, wherein the plurality of assessments comprises scores and text descriptions;
   calculating an aggregate score for the resource from the scores from the plurality of assessments;
   assigning identifiers to the text descriptions from the plurality of assessments, wherein the identifiers represent semantic expressions in the text descriptions;
   receiving a selection of a subset of the identifiers; and
   providing a recalculated aggregate score for the resource that is based on a subset of the plurality of assessments that are assigned identifiers in the subset of the identifiers.

2. The non-transitory computer-readable medium of claim 1, wherein the plurality of assessments are received from a plurality of different websites, and each of the plurality of different websites independently provides the resource.

3. The non-transitory computer-readable medium of claim 2, wherein calculating the aggregate score for the resource comprises calculating an average score from the plurality of assessments received from the plurality of different websites.

4. The non-transitory computer-readable medium of claim 3, wherein the operations further comprise:
   receiving a new assessment from one of the plurality of different websites; and
   recalculating the aggregate score for the resource to incorporate a score from the new assessment.

5. The non-transitory computer-readable medium of claim 1, wherein an assessment in the plurality of assessments is received as a result of an event generated by a website, and the event is generated by the website as a result of the resource being made available by the website.

6. The non-transitory computer-readable medium of claim 1, wherein an assessment in the plurality of assessments is received as a result of an event generated by a website, and the event is generated by the website as a result of the assessment being received by the website after the resource is made available by the website.

7. The non-transitory computer-readable medium of claim 1, wherein the scores comprise numerical scores received from users of the resource, and the text descriptions comprise reviews of the resource from the users.

8. The non-transitory computer-readable medium of claim 1, wherein calculating an aggregate score for the resource comprises:
processing the text descriptions from the plurality of assessments as inputs to a machine-learning (ML) model, wherein the ML model comprises the identifiers as outputs.

9. The non-transitory computer-readable medium of claim 8, wherein the operations further comprise:
training the ML model using a supervised learning process that trains the ML model using a set of labeled assessments.

10. The non-transitory computer-readable medium of claim 8, wherein the operations further comprise:
assigning an identifier to an assessment when the ML model provides a score for the identifier that is above a predetermined threshold.

11. The non-transitory computer-readable medium of claim 8, wherein the operations further comprise:
determining that an identifier from the ML model provides a score that is below a predetermined threshold when processing an assessment;
receiving an indication as to whether the identifier should be assigned to the assessment; and
retraining the ML model using the identifier and the assessment.

12. The non-transitory computer-readable medium of claim 11, wherein the operations further comprise:
reducing the predetermined threshold over time as the ML model is retrained.

13. The non-transitory computer-readable medium of claim 1, wherein the operations further comprise:
receiving a selection of the resource; and
providing the aggregate score for the resource and the identifiers assigned to the plurality of assessments for display.

14. The non-transitory computer-readable medium of claim 13, wherein the operations further comprise:
recalculating the aggregate score by removing components of the aggregate score that are based on assessments that are assigned identifiers that are not in the subset of the identifiers.

15. The non-transitory computer-readable medium of claim 13, wherein the operations further comprise:
receiving a selection of identifiers to be excluded from recalculating the aggregate score; and
generating the subset of the identifiers from unselected identifiers.

16. The non-transitory computer-readable medium of claim 1, wherein at least one of the identifiers represents a semantic expression associated with a process by which the resource is provided to a user.

17. The non-transitory computer-readable medium of claim 1, wherein at least one of the identifiers represents a semantic expression associated with a quality of the resource.

18. The non-transitory computer-readable medium of claim 1, wherein at least one of the identifiers represents a semantic expression associated with a website providing the resource.

19. A method of selectively characterize a resource, the method comprising:
receiving a plurality of assessments for a resource, wherein the plurality of assessments comprises scores and text descriptions;
calculating an aggregate score for the resource from the scores from the plurality of assessments;
assigning identifiers to the text descriptions from the plurality of assessments, wherein the identifiers represent semantic expressions in the text descriptions;
receiving a selection of a subset of the identifiers; and
providing a recalculated aggregate score for the resource that is based on a subset of the plurality of assessments that are assigned identifiers in the subset of the identifiers.

20. A system comprising:
one or more processors; and
one or more memory devices comprising instructions that, when executed by the one or more processors, cause the one or more processors to perform operations comprising:
receiving a plurality of assessments for a resource, wherein the plurality of assessments comprises scores and text descriptions;
calculating an aggregate score for the resource from the scores from the plurality of assessments;
assigning identifiers to the text descriptions from the plurality of assessments, wherein the identifiers represent semantic expressions in the text descriptions;
receiving a selection of a subset of the identifiers; and
providing a recalculated aggregate score for the resource that is based on a subset of the plurality of assessments that are assigned identifiers in the subset of the identifiers.

* * * * *